(12) United States Patent
Turner et al.

(10) Patent No.: US 7,657,787 B2
(45) Date of Patent: Feb. 2, 2010

(54) METHOD OF RESTORING COMMUNICATION STATE OF PROCESS

(75) Inventors: Yoshio Frank Turner, Palo Alto, CA (US); Dinesh Kumar Subhraveti, Milpitas, CA (US); Jose Renato Santos, Palo Alto, CA (US); Gopalakrishnan Janakiraman, Palo Alto, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 409 days.

(21) Appl. No.: 11/401,615

(22) Filed: Apr. 11, 2006

(65) Prior Publication Data

US 2007/0260920 A1 Nov. 8, 2007

(51) Int. Cl.
*G06F 11/00* (2006.01)
(52) U.S. Cl. .......................... 714/15; 714/4
(58) Field of Classification Search .............. 714/15
See application file for complete search history.

(56) References Cited

U.S. PATENT DOCUMENTS

| | | | | |
|---|---|---|---|---|
| 5,748,882 A | * | 5/1998 | Huang | 714/47 |
| 5,754,752 A | * | 5/1998 | Sheh et al. | 714/4 |
| 5,828,569 A | * | 10/1998 | Fisher | 700/82 |
| 6,338,147 B1 | | 1/2002 | Meth et al. | |
| 7,254,739 B2 | * | 8/2007 | McCain | 714/4 |
| 7,337,444 B2 | * | 2/2008 | Browning et al. | 718/107 |
| 2002/0087916 A1 | | 7/2002 | Meth | |
| 2004/0139440 A1 | * | 7/2004 | Browning et al. | 718/107 |

FOREIGN PATENT DOCUMENTS

| | | | |
|---|---|---|---|
| WO | WO 2004/015513 A2 | | 2/2004 |
| WO | WO 2004015513 A2 | * | 2/2004 |

OTHER PUBLICATIONS

Lorenzo Alvisi, et al., Wrapping Server-Side TCP to Mask Connection Failures, 2000, Department of Computer Sciences, UT Austin, Austin, TX.
Aurelien Bouteiller, et al., Coordinated checkpoint versus message log for fault tolerant MPI, 2003, Universite de Paris Sud, Orsay, France.
Jason Duell, et al., The Design and Implementation of Berkeley Lab's Linux Checkpoint/Restart, 2003, Lawrence Berkeley National laboratory, Berkely, CA.

(Continued)

*Primary Examiner*—Yolanda L Wilson

(57) ABSTRACT

An embodiment of a method of restoring a communication state of a process includes creating a new socket for a socket saved as part of a checkpoint of the communication state. The new socket is initialized with an adjusted transmission control protocol state saved as part of the checkpoint. The adjusted transmission control protocol state indicates that a send buffer and a receive buffer are empty. Send data saved as part of the checkpoint is written into the new socket. Receive data saved as part of the checkpoint is written into a restart buffer. While at least a portion of the receive data remains in the restart buffer, a socket read system call for the new socket is redirected to read the receive data that remains in the restart buffer.

25 Claims, 2 Drawing Sheets

OTHER PUBLICATIONS

E.N. (Mootaz) Elnozahy et al., A Survey of Rollback-Recovery Protocols in Message-Passing Systems, Sep. 2002, pp. 275-408, ACM Computing Surveys, vol. 34, No. 3.

John G. Janakiraman et al., Cruz: Application-Transparent Distributed Checkpoint-Restart on Standard Operating Systems, Apr. 14, 2005, Tech Report HPL-2005-66.

Mahesh Kallahalla et al., SoftUDC: A Software-Based Data Center for Utility Computing, Computer, Nov. 2004, pp. 38-46, IEEE Computer Society.

Michael Litskow, et al., Checkpoint and Migration of UNIX Processes in the Condor Distributed Processing System, 1997, University of Wisconsin-Madison, Madison, WI.

Meiosys; MetaCluster TM, Modular architecture, 2004 [retrieved on Oct. 18, 2005] Retrieved from the Internet <http://www3.meiosys.com/eng/technology/index.html>.

Meiosys; Utility Computing, 2004 [retrieved on Oct. 18, 2005] Retrieved from the Internet <http://www3.meiosys.com/eng/products/uc.html>.

Meiosys; High Performance Computing, 2004 [retrieved on Oct. 18, 2005] Retrieved from the Internet <http://www3.meiosys.com/eng/products/hpc.html>.

Meiosys; Fault Tolerance, 2004 [retrieved on Oct. 18, 2005] Retrieved from the Internet <http://www3.meiosys.com/eng/products/ft.html>.

Steven Osman, et al., The Design and Implementation of Zap: A System for Migrating Computing Environments, 5th Sumposium on Operating Systems Design and Implementation (OSDI 2002),Dec. 2002, Boston, MA.

James S. Plank et al., Libckpt: Transparent Checkpointing under Unix, USENIX Winter 1995 Technical Conference, Jan. 16-20, 1995, New Orleans, LA.

James S. Plank, An Overview of Checkpointing in Uniprocessor and Distributed Systems, Focusing on Implementation and Performance, Jul. 1997, Department of Computer Science University of Tennessee, Technical report UT-CS-97-372, Knoxville, TN.

Georg Stellner, CoCheck: Checkpointing and Process Migration for MPI, 1996, Munich, Germany.

Zhang Youhui, et al. Checkpointing and Migration of Parallel Processes Based on Message Passing Interference, 2002, Tsinghua University, China.

Hua Zhong, et al., CRAK: Linus Checkpoint/Restart As a Kernal Module, Technical Report CUCS-014-01, 2001, New York, NY.

VMware VirtualCenter Technical Best Practices, Jun. 2005, [retrieved on Jun. 26, 2006], Retrieved from the Internet <http://www.vmware.com/pdf/vc_technical_best.pdf/>.

* cited by examiner

METHOD OF RESTORING COMMUNICATION STATE OF PROCESS

RELATED APPLICATION

This application is related to U.S. Ser. No. 11/401,614, filed on Apr. 11, 2006 U.S. Patent Publication No. 20070239854, the contents of which is hereby incorporated by reference.

FIELD OF THE INVENTION

The present invention relates to the field of computing. More particularly, the present invention relates to the field of computing where a communication state of a process is restored.

BACKGROUND OF THE INVENTION

A computer in operation includes hardware, software, and data. The hardware typically includes a processor, memory, storage, and I/O (input/output) devices coupled together by a bus. The software typically includes an operating system and applications. The applications perform useful work on the data for a user or users. The operating system provides an interface between the applications and the hardware. The operating system performs two primary functions. First, it allocates resources to the applications. The resources include hardware resources—such as processor time, memory space, and I/O devices—and software resources including some software resources that enable the hardware resources to perform tasks. Second, it controls execution of the applications to ensure proper operation of the computer.

Often, the software is conceptually divided into a user level, where the applications reside and which the users access, and a kernel level, where the operating system resides and which is accessed by system calls. Within an operating computer, a unit of work is referred to as a process. A process is computer code and data in execution. The process may be actually executing or it may be ready to execute or it may be waiting for an event to occur. The system calls provide an interface between the processes and the operating system.

Checkpointing is a technique employed on some computers where processes take significant time to execute. By occasionally performing a checkpoint of processes and resources assigned to processes, the processes can be restarted at an intermediate computational state in an event of a system failure. Migration is a technique in which running processes are checkpointed and then restarted on another computer. Migration allows some processes on a heavily used computer to be moved to a lightly used computer. Checkpointing, restart, and migration have been implemented in a number of ways.

In *The Design and Implementation of Zap: A System for Migrating Computing Environments*,Proc. OSDI 2002,Osman et al. teach a technique of adding a loadable kernel module to a standard operating system to provide checkpoint, restart, and migration of processes implemented by existing applications. The loadable kernel model divides the application level into process domains and provides virtualization of resources within each process domain. Such virtualization of resources includes virtual process identifiers and virtualized network addresses. Processes within one process domain are prevented from interacting with processes in another process domain using inter-process communication techniques. Instead, processes within different process domains interact using network communications and shared files set up for communication between different computers.

Checkpointing in the technique taught by Osman et al. records the processes in a process domain as well as the state of the resources used by the processes. Because resources in the process domain are virtualized, restart or migration of a process domain includes restoring resource identifications to a virtualized identity that the resources had at the most recent checkpoint.

While the checkpoint, restart, and migration techniques taught by Osman et al. show promise, several areas could be improved. In particular, communication state that exists outside of the process domain at checkpoint may need to be restored.

SUMMARY OF THE INVENTION

The present invention is a method of restoring a communication state of a process. According to an embodiment, the method of restoring the communication state of the process includes creating a new socket for a socket saved as part of a checkpoint of the communication state. The new socket is initialized with an adjusted transmission control protocol state saved as part of the checkpoint. The adjusted transmission control protocol state indicates that a send buffer and a receive buffer are empty. Send data saved as part of the checkpoint is written into the new socket. Receive data saved as part of the checkpoint is written into a restart buffer. While at least a portion of the receive data remains in the restart buffer, a socket read system call for the new socket is redirected to read the receive data that remains in the restart buffer.

BRIEF DESCRIPTION OF THE DRAWINGS

The present invention is described with respect to particular exemplary embodiments thereof and reference is accordingly made to the drawings in which.

DETAILED DESCRIPTION OF A PREFERRED EMBODIMENT

Figure 1:
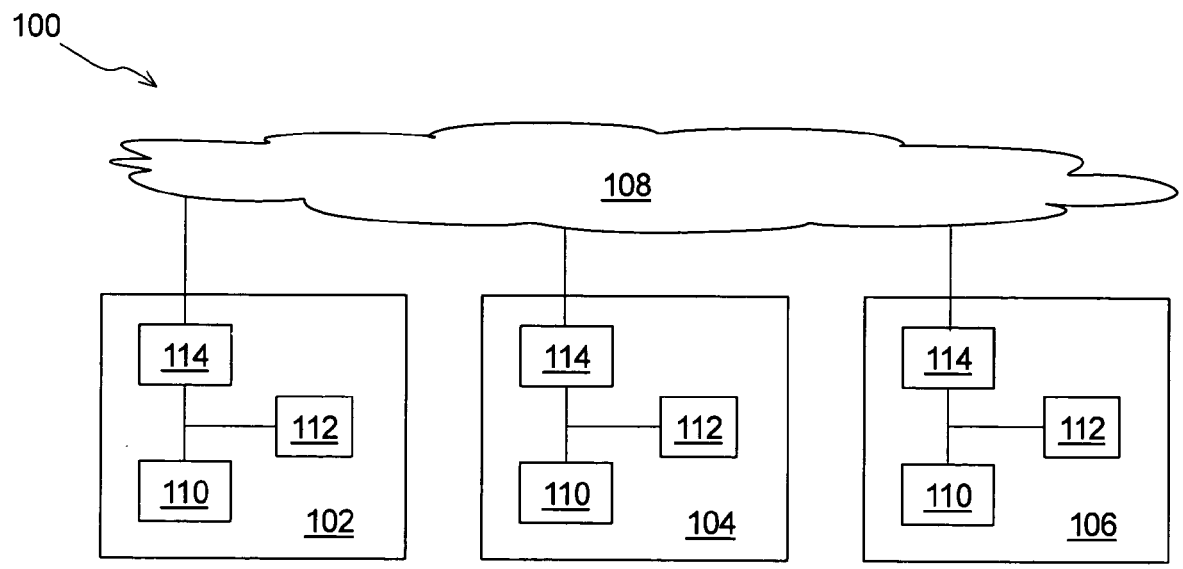
FIG. 1 illustrates a computer network in accordance with embodiments of the present invention.

A computer network which employs a method of restoring a communication state of a process in accordance with embodiments of the present invention is illustrated in FIG. 1. The computer network comprises first through third hosts, 102 . . . 106, coupled by a communication medium 108. The first through third hosts, 102 . . . 106, on the computer network 108 may be referred to as nodes. Each of the first through third hosts, 102 . . . 106, comprises a computer that includes a processor 110, memory 112 (which is one type of a computer readable storage medium), and a network interface 114. The first through third hosts, 102 . . . 106, may communicate over the communication medium 108. For example, the first host 102 may communicate with the second host 104 by exchanging messages over the network.

Depending upon the protocol used for the message passing each of the first and second hosts, 102 and 104, may maintain communication state that facilitates the message passing. For example, if the first and second hosts, 102 and 104, are employing Transmission Control Protocol (TCP), each of the first and second hosts, 102 and 104, maintains communication state while creating, operating, and tearing down a connection between the first and second hosts, 102 and 104. TCP provides reliable transmission of messages over the communication medium 108; it transparently handles corrupted or lost messages, ensures that messages are received in the order that they are sent, and controls transmission of messages based on network congestion. The communication state may include socket state and in-transit data. The socket state may include a socket for each of local and remote hosts (i.e., the first and second hosts, 102 and 104), sequence numbers, and timers. The in-transit data may include send data (i.e., data waiting to be sent or sent data waiting for acknowledgment or both) and receive data (i.e., data awaiting transfer to a recipient process on the host).

In an embodiment of the method of restoring the communication state of the process, the communication state is restored on the first host 102 where the process was executing at a time of a checkpoint. For example, such an embodiment may be used in a distributed computing environment where coordinated checkpointing is being used for communicating processes that reside on different hosts. In another embodiment, the communication state is restored on the third host 106 as part of a migration of the process from the first host 102, where the process was executing at the time of the checkpoint, to the third host 106.

Figure 2:
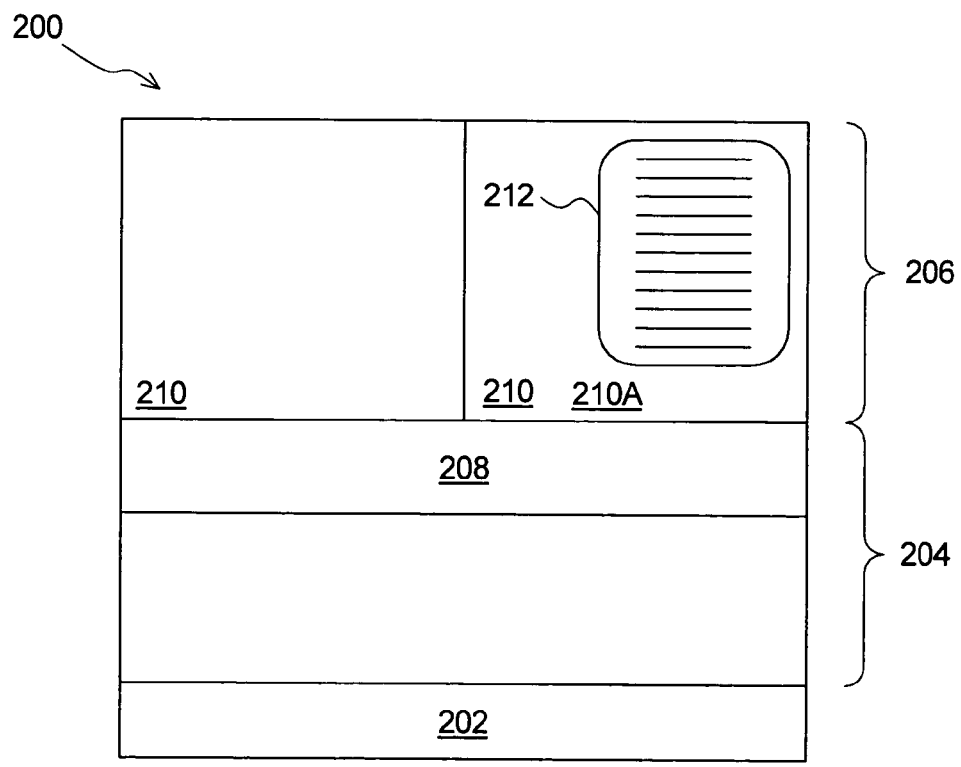
FIG. 2 illustrates a host computer system in accordance with embodiments of the present invention.

An embodiment of a host computer system where the process may have been executing at a time of the checkpoint or where the process may begin executing after restoration of the communication state of the process is illustrated schematically in FIG. 2. The host computer system 200 includes computer hardware 202, an operating system kernel 204, and a user level 206. The operating system kernel 204 may include a process domain module 208, which forms one or more process domains 210 at the user level. The process 212 may have been executing in a particular process domain 210A prior to a time of the checkpoint or may be about to resume execution after the restoration of the communication state. According to this embodiment, the checkpoint of the process 212 may further include the checkpoint of the particular process domain 210A and the restoration of the communication state of the process 212 may include restoration of the particular process domain 210A.

Figure 3:
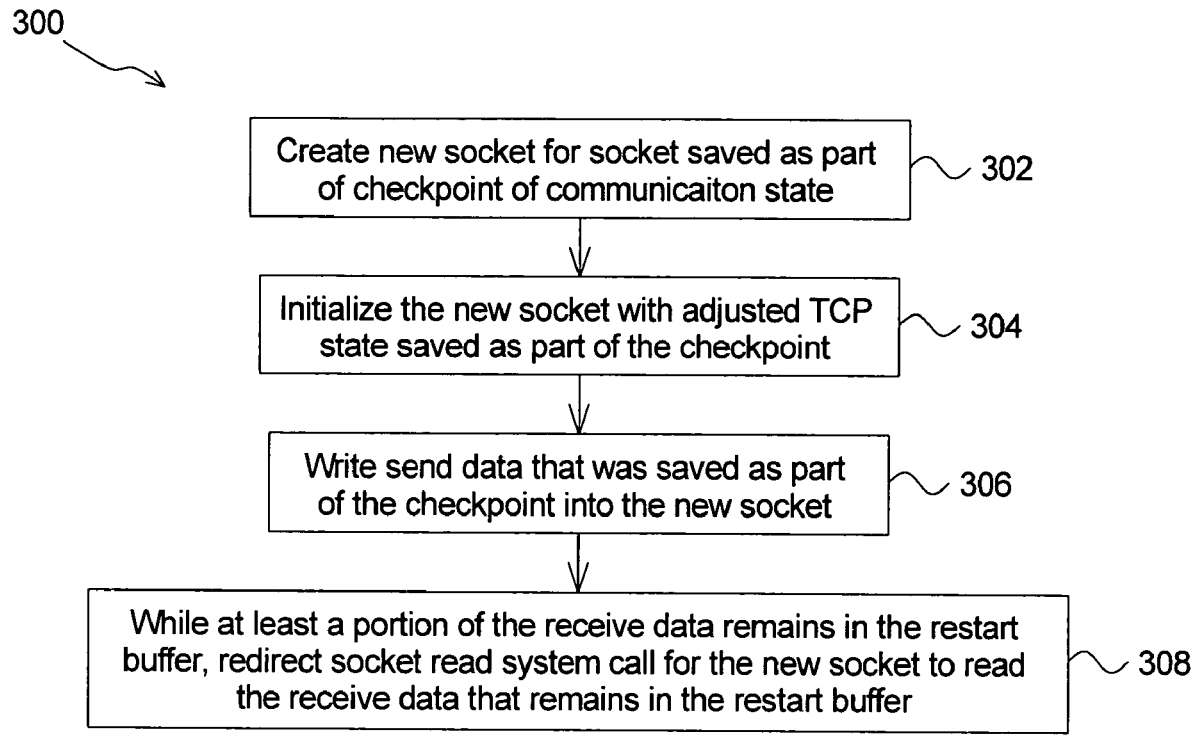
FIG. 3 illustrates an embodiment of a method of restoring a communication state of a process of the present invention as a flow chart.

An embodiment of a method of restoring a communication state of a process of the present invention is illustrated as a flow chart in FIG. 3. The method 300 begins with a first step 302 of creating a new socket for a socket saved as part of a checkpoint of the communication state. In general, a socket allows an application operating at a user level to establish a connection with a remote process, send messages from the application's send buffer, and receive messages to the application's receive buffer. The socket saved as part of the checkpoint may have a connection with a remote socket on a remote host and may be sending messages or receiving messages or both.

In a second step 304, the new socket is initialized with an adjusted TCP state saved as part of the checkpoint. The adjusted TCP state indicates that a send buffer and a receive buffer are empty. In computer networking, a buffer is an area of memory that is used for storing messages. Typically, a buffer has other properties such as input and output pointers, where data will be written into and out of the buffer, respectively, and a count of used or free space. Forming the adjusted TCP state may include modifying the associated sequence numbers (e.g., by modifying the sequence numbers for the last sent data and for the last data delivered to the user).

In a third step 306, send data that was saved as part of the checkpoint is written into the new socket. In a fourth step, 308 receive data that was saved as part of the checkpoint is written into a restart buffer.

While at least a portion of the receive data remains in the restart buffer, the method 300 continues with a fourth step 308 of redirecting a socket read system call for the new socket to read the receive data that remains in the restart buffer. A system call invokes an operating system routine. A socket read system call invokes an operating system read of a socket.

In an embodiment, the first through fourth steps, 302 . . . 308, are performed on a node (e.g., the first host 102 of the computer network 100 of FIG. 1) where the checkpoint operation was performed. In another embodiment, the first through fourth steps, 302 . . . 308, are performed on a particular node (e.g., the third host 106 of the computer network 100) other than a node (e.g., the first host 102 of the computer network 100) where the checkpoint was formed. According to this embodiment, the method 300 may further include migrating an Internet Protocol (IP) address from the node to the particular node. For example, the IP address may be migrated according to an embodiment of a method of migrating a process domain taught in related U.S. Patent Publication No. 20070239854 filed on Apr. 11, 2006, which is incorporated by reference in the related application section above.

In an alternative embodiment, the method 300 further comprises performing a checkpoint operation that produces the checkpoint of the communication state.

Figure 4:
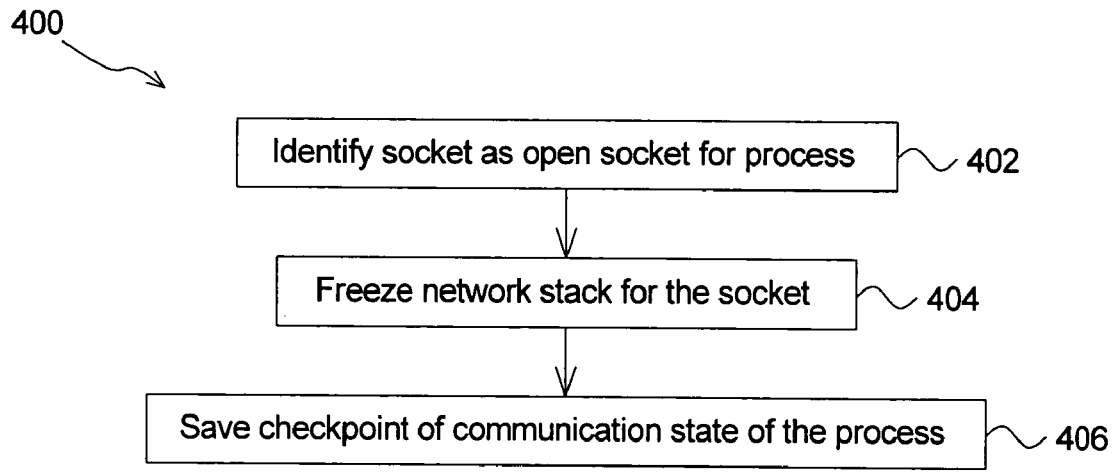
FIG. 4 illustrates an embodiment of a checkpoint operation of the present invention as a flow chart.

An embodiment of the checkpoint operation of the present invention is illustrated as a flow chart in FIG. 4. In a first step 402 of the checkpoint operation 400, the socket is identified as an open socket for the process.

In a second step 404, the checkpoint operation 400 freezes a network stack for the socket. The network stack is a stack of network protocols for an operating system. The most common network stack employs (a) sockets, (b) TCP, (c) IP, and (d) Ethernet. TCP and sockets are discussed more fully above. IP provides addressing and routing functions so that messages can be delivered to their destination. Ethernet provides means for sending and receiving packets on the physical communication medium. The network stack provides a common sockets communication interface that can be used by application programmers for programming their applications.

When an application communicates over the network, the network stack creates and maintains a significant amount of communication state. This communication state may include data structures and in-transit data. The data structures may be created by one or more of the protocol layers (e.g., port structures created by the socket layer, sequence numbers created by the TCP layer, etc.). The in-transit data includes send data and receive data. Send data is data that has been provided by an application process through the socket interface to the network stack and awaits transmission or that has been sent and awaits receipt acknowledgment by a remote process. Receive data is data that has been received from the remote process but that awaits forwarding to the local application process.

Freezing the network stack may include stopping the process to prevent the process from sending or receiving messages through a socket interface, stopping a node that hosts the process from sending or receiving messages on behalf of the process, and acquiring locks in an operating system kernel on the node to prevent network processing on behalf of the process. A lock is a mechanism for enforcing exclusive access to a resource in an environment where there are multiple threads of execution. Stopping the process to prevent the process from sending or receiving messages may employ operating system packet filters to selectively drop send packets and received packets.

In a third step 406, the checkpoint of the communication state of the socket is saved. Saving the communication state of the socket may include reading data in the receive buffer for the socket, capturing transmission control protocol state from the operating system kernel for the socket, and reading data in the send buffer for the socket by walking through a buffer list of the operating system kernel. Preferably, capturing the TCP state is performed after reading the data in the receive buffer for the socket because it reduces efforts required to later modify the TCP state. Alternatively, capturing the TCP state is performed before or while reading the data in the receive buffer. Reading the data in the receive buffer may employ a socket read system call, which may include a message peek option. The message peek option is an option for the socket read system call that directs the operating system to read data in the socket without destroying the data. The TCP state for the socket may include a local IP address, a local port, a remote IP address, and a remote port. The TCP state for the socket may further include sequence numbers and timers.

In an alternative embodiment, the checkpoint operation 400 further comprises checkpointing additional state information for a process domain that hosts the process. Checkpointing the additional state information may be performed by a process domain module (e.g., the process domain module 208 of FIG. 2). Such additional state information may include processes, threads (i.e., processes that share at least some resources), memory, shared memory, processor state, file descriptors, pipes, signals, terminal state, semaphores, and other state information. In an alternative embodiment of the method 300 (FIG. 3), the method includes an additional step of restoring the additional state information of the process domain, which may be performed by a kernel module (e.g., a loadable kernel module).

In an alternative embodiment, the checkpoint operation further comprises forming the adjusted TCP state by modifying the TCP state to indicate that the send buffer and the receive buffer are empty.

The foregoing detailed description of the present invention is provided for the purposes of illustration and is not intended to be exhaustive or to limit the invention to the embodiments disclosed. Accordingly, the scope of the present invention is defined by the appended claims.

What is claimed is:

1. A method of restoring a communication state of a process comprising the steps of:
   creating a new socket for a socket saved as part of a checkpoint of the communication state;
   initializing the new socket with an adjusted transmission control protocol state saved as part of the checkpoint, the adjusted transmission control protocol state indicating that a send buffer and a receive buffer are empty;
   writing send data saved as part of the checkpoint into the new socket;
   writing receive data saved as part of the checkpoint into a restart buffer; and
   while at least a portion of the receive data remains in the restart buffer, redirecting a socket read system call for the new socket to read the receive data that remains in the restart buffer.

2. The method of claim 1 further comprising performing a checkpoint operation that produces the checkpoint of the communication state.

3. The method of claim 2 wherein the steps of creating the new socket, initializing the new socket, writing the send data, writing the receive data, and redirecting the socket read system call are performed on a first computer where the checkpoint operation was performed.

4. The method of claim 2 wherein the steps of creating the new socket, initializing the new socket, writing the send data, writing the receive data, and redirecting the socket read system call are performed on a first computer that is different from a second computer where the checkpoint operation was performed.

5. The method of claim 4 further comprising migrating an internet protocol address for the socket saved as part of the checkpoint from the second computer to the first computer.

6. The method of claim 2 wherein the checkpoint operation comprises:
   identifying the socket as an open socket for the process;
   freezing a network stack for the socket; and
   saving the checkpoint of the communication state of the socket.

7. The method of claim 6 wherein the checkpoint operation further comprises checkpointing additional state information for a process domain that hosts the process.

8. The method of claim 7 further comprising restoring the additional state information of the process domain.

9. The method of claim 8 wherein restoration of the communication state of the process and the additional state information of the process domain is performed by a kernel module.

10. The method of claim 6 wherein freezing the network stack for the socket includes stopping the process to prevent the process from sending or receiving messages through a socket interface, stopping a computer that hosts the process from sending or receiving messages on behalf of the process, and acquiring locks in an operating system kernel on the computer to prevent network processing on behalf of the process.

11. The method of claim 10 wherein stopping the computer that hosts the process from sending or receiving the messages on behalf of the process employs operating system packet filters to selectively drop sent packets and received packets.

12. The method of claim 6 wherein saving the communication state of the socket includes reading data in the receive buffer for the socket, capturing transmission control protocol state from the operating system kernel for the socket, and reading data in the send buffer for the socket by walking through a buffer list of the operating system kernel.

13. The method of claim 12 wherein capturing the transmission control protocol state from the operating system kernel for the socket is performed after reading the data in the receive buffer for the socket.

14. The method of claim 12 wherein reading the data in the receive buffer employs a socket read system call.

15. The method of claim 14 wherein the socket read system call includes a message peek option.

16. The method of claim 12 wherein the transmission control protocol state for the socket further includes a local internet protocol address, a local port, a remote internet protocol address, and a remote port.

17. The method of claim 16 wherein the transmission control protocol state for the socket further includes sequence numbers and timers.

18. The method of claim 12 further comprising forming the adjusted transmission control protocol state by modifying the transmission control protocol state to indicate that the send buffer and the receive buffer are empty.

19. The method of claim 1, wherein the adjustment transmission control protocol state is created by modifying sequence numbers for a last sent data and a last delivered data.

20. A method of restoring a communication state of a process comprising the steps of:

identifying an open socket for the process;

freezing a network stack for the open socket which includes stopping the process to prevent the process from sending or receiving messages through a socket interface, stopping a first computer that hosts the process from sending or receiving messages on behalf of the process, and acquiring locks in an operating system kernel on the first computer to prevent network processing; and saving the communication state of the open socket as part of a checkpoint which includes reading data in a receive buffer for the open socket, capturing transmission control protocol state from the operating system kernel for the open socket, and reading data in a send buffer for the open socket by walking through a buffer list of the operating system kernel;

adjusting the transmission control protocol state to indicate that the send buffer and the receive buffer are empty which forms an adjusted transmission control protocol state;

creating a new socket for the open socket saved as part of the checkpoint of the communication state;

initializing the new socket with the adjusted transmission control protocol state saved as part of the checkpoint;

writing send data saved as part of the checkpoint into the new socket;

writing receive data saved as part of the checkpoint into a restart buffer; and while at least a portion of the receive data remains in the restart buffer, redirecting a socket read system call for the new socket to read the receive data that remains in the restart buffer.

21. The method of claim 20, where creating the new socket, initializing the new socket, writing send data, writing receive data, and redirecting the socket system call are performed on a second computer to which the process is migrated from the first computer.

22. The method of claim 20, wherein adjusting the transmission control protocol state comprises modifying sequence numbers for a last sent data and a last delivered data.

23. A computer readable storage medium comprising computer code that when executed by a first computer implements a method of restoring a communication state of a process, comprising the steps of:

creating a new socket for a socket saved as part of a checkpoint of the communication state;

initializing the new socket with an adjusted transmission control protocol state saved as part of the checkpoint, the adjusted transmission control protocol state indicating that a send buffer and a receive buffer are empty;

writing send data saved as part of the checkpoint into the new socket;

writing receive data saved as part of the checkpoint into a restart buffer; and while at least a portion of the receive data remains in the restart buffer, redirecting a socket read system call for the new socket to read the receive data that remains in the restart buffer.

24. The computer readable storage medium of claim 23, wherein creating the new socket, initializing the new socket, writing the send data, writing the receive data, and redirecting the socket system call are performed by the first computer as part of a procedure to migrate the process from a second computer to the first computer, wherein the checkpoint was created at the second computer.

25. The computer readable storage medium of claim 23, wherein the adjusted transmission control protocol state is created by modifying sequence numbers for a last sent data and a last delivered data.

* * * * *